United States Patent

Kunimatsu et al.

[11] Patent Number: 5,807,511
[45] Date of Patent: Sep. 15, 1998

[54] COMPOSITION FOR FORMING A NEAR INFRARED SCREENING FILTER, AND NEAR INFRARED SCREENING FILTER

[75] Inventors: Masaaki Kunimatsu, Yokohama; Yuji Yamazaki, Ootawara, both of Japan

[73] Assignee: Dai Nippon Toryo Co., Ltd., Osaka, Japan

[21] Appl. No.: 825,570

[22] Filed: Mar. 31, 1997

[30] Foreign Application Priority Data

Apr. 3, 1996 [JP] Japan ...................................... 8-081418
Sep. 24, 1996 [JP] Japan ...................................... 8-0251160

[51] Int. Cl.⁶ ................................ F21V 9/04; G02B 5/22
[52] U.S. Cl. ............................................ 252/587; 359/885
[58] Field of Search ..................... 252/582, 587; 359/350, 885

[56] References Cited

U.S. PATENT DOCUMENTS

| | | | |
|---|---|---|---|
| 3,051,596 | 8/1962 | Baltzer | 252/587 |
| 4,791,023 | 12/1988 | Suzuki et al. | 252/587 |
| 4,923,638 | 5/1990 | Ohno et al. | 252/587 |
| 4,933,110 | 6/1990 | Tucker | 252/582 |
| 5,173,212 | 12/1992 | Speit et al. | 252/587 |
| 5,211,885 | 5/1993 | Zepp | 252/582 |
| 5,270,854 | 12/1993 | Lee et al. | 252/582 |
| 5,296,162 | 3/1994 | Itoh et al. | 252/587 |
| 5,426,310 | 6/1995 | Tamada et al. | 252/587 |
| 5,518,810 | 5/1996 | Nishihara et al. | 252/587 |
| 5,543,086 | 8/1996 | Bertelson et al. | 252/587 |
| 5,582,774 | 12/1996 | Itoh et al. | 252/587 |

*Primary Examiner*—Philip Tucker
*Attorney, Agent, or Firm*—Oblon, Spivak, McClelland, Maier & Neustadt, P.C.

[57] ABSTRACT

A composition for forming a near infrared screening filter, which comprises a binder (i), a metal oxide or inorganic oxide powder (ii) having a light transmittance ratio (transmittance of light with a wavelength of 550 nm/transmittance of light with a wavelength of 1180 nm) of at least 3, and a dye (iii) having a light transmittance ratio (transmittance of light with a wavelength of 550 nm/transmittance of light with a wavelength of from 740 to 930 nm) of at least 2.7, as essential components.

5 Claims, 3 Drawing Sheets

COMPOSITION FOR FORMING A NEAR INFRARED SCREENING FILTER, AND NEAR INFRARED SCREENING FILTER

BACKGROUND OF THE INVENTION

1. Field of the Invention

The present invention relates to a composition for forming a near infrared screening filter, i.e. a composition forming a filter which is a coating film or a film-shaped formed product showing transmittance of visible light and having a function of selectively cutting off near infrared rays, and the filter.

2. Discussion of Background

A near infrared screening filter has been widely used as a means for preventing a malfunction of various IC, as a means for preventing counterfeit of credit cards or the like, or a near infrared reflecting film to improve the thermal efficiency of an air conditioner.

As a typical example of a filter which transmits light with a wavelength of from 400 to 699 nm in a visible light range and absorbs light with a wavelength of from 700 to 2200 nm in a near infrared range and which thus has a function of cutting off near infrared rays, a filter is known which has a thin film of a metal oxide such as tin-doped indium oxide (hereinafter referred to as ITO) or antimony-doped tin oxide (hereinafter referred to as ATO) having a light transmittance ratio (transmittance of light with a wavelength of 550 nm/transmittance of light with a wavelength of 1180 nm) of at least 3, formed on a glass substrate by vapor deposition. However, this near infrared screening filter has had problems such that it is required to use an apparatus for vapor deposition which requires a high degree of vacuum and a high level of accurate control of the atmosphere, whereby the production cost tends to be high, and it is poor in mass productivity or general purpose applicability.

Under the circumstances, a composition for a near infrared screening filter comprising inexpensive mass-producible ITO powder or ATO powder and a binder, has been developed and has attracted attention (e.g. JP-A-7-24957, JP-A-7-70363, JP-A-7-70481, JP-A-7-70482, JP-A-7-70445).

However, with a near infrared screening filter obtained from such a composition for a near infrared screening filter comprising ITO powder or ATO powder and a binder, the light transmittance in a near infrared range with a wavelength of 700 to 1400 nm is slightly high, although the light transmittance in a near infrared region with a wavelength exceeding 1400 nm is very low. Accordingly, a near infrared screening filter having the light transmittance in this near infrared range further lowered, has been desired in the market.

SUMMARY OF THE INVENTION

It is an object of the present invention to solve the above-mentioned problems of the conventional composition for a near infrared screening filter comprising ITO powder or ATO powder and a binder and to provide a composition for forming a near infrared screening filter, which enables to produce a near infrared screening filter which transmits light in a visible light range and which is mass-producible at a low cost and which enables to produce a near infrared screening filter which shows a low light transmittance even in a near infrared range with a wavelength of from 700 to 1400 nm.

The present inventors have conducted various studies to solve the above problems and as a result, have found that by incorporating a certain specific oxide powder and a certain specific dye, it is possible to obtain a near infrared screening filter which shows a low light transmittance even in a near infrared range with a wavelength of from 700 to 1400 nm. The present invention has been accomplished on the basis of this discovery.

Namely, the present invention provides a composition for forming a near infrared screening filter, which comprises a binder (i), a metal oxide or inorganic oxide powder (hereinafter referred to as oxide powder) (ii) having a light transmittance ratio (transmittance of light with a wavelength of 550 nm/transmittance of light with a wavelength of 1180 nm) of at least 3, and a dye (iii) having a light transmittance ratio (transmittance of light with a wavelength of 550 nm/transmittance of light with a wavelength of from 740 to 930 nm) of at least 2.7, as essential components.

The present invention also provides a near infrared screening filter made of such a composition.

DETAILED DESCRIPTION OF THE PREFERRED EMBODIMENTS

Figure 1:
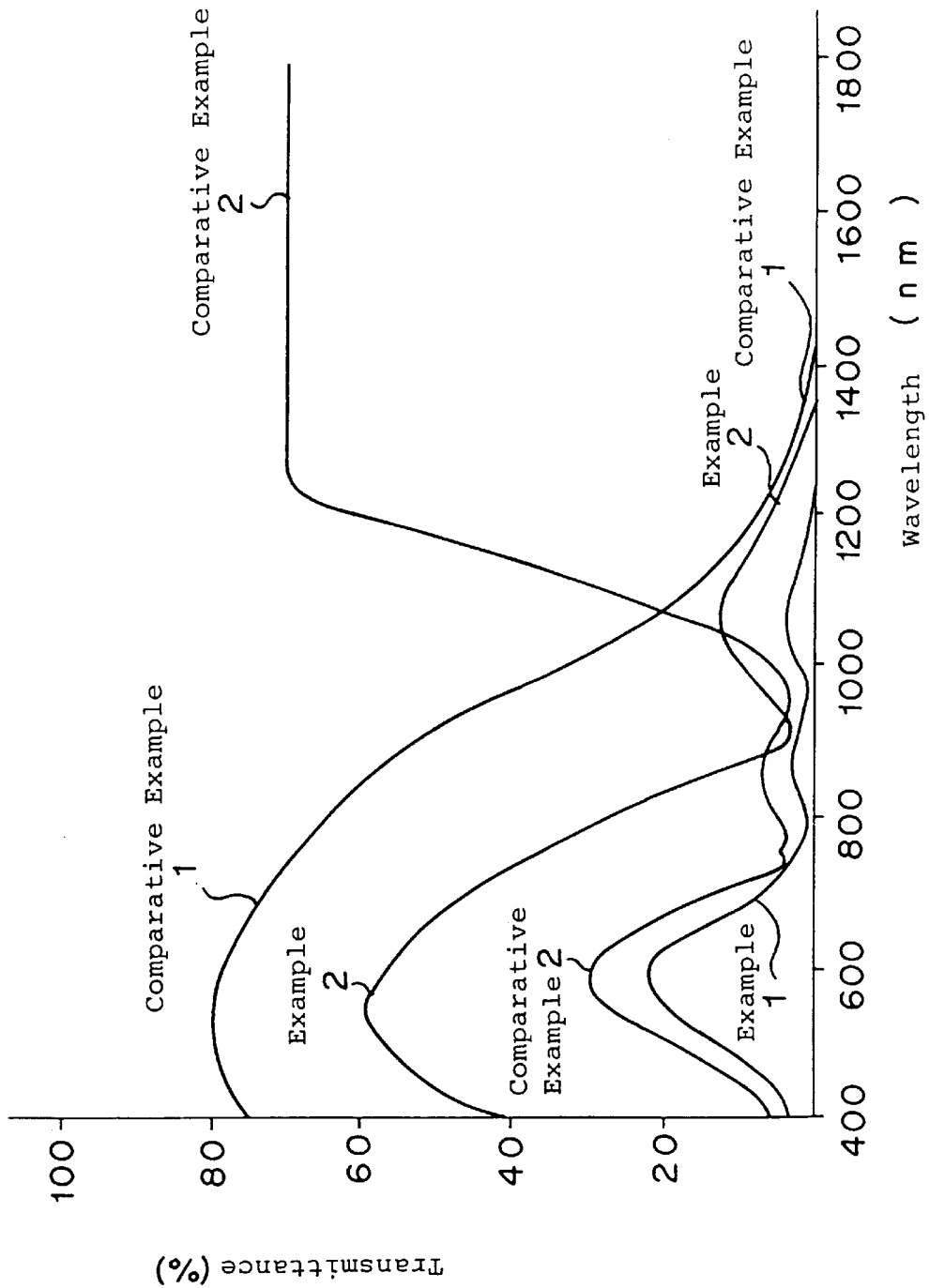
FIG. 1 shows spectral transmittance curves of the filters of Examples 1 and 2 and Comparative Examples 1 and 2.

Now, the present invention will be described in detail.

The composition for forming a near infrared screening filter of the present invention comprises a binder, an oxide powder and a dye, as essential components, and may further contain a solvent and various additives, such as a curing accelerator, a defoaming agent, a wetting agent or a viscosity-adjusting agent, as the case requires.

As the binder (i) to be used in the present invention, various organic binders which are commonly used for molding or coating materials and which show transmittance of light in a visible light range, can be used without any particular restriction. Specifically, various organic resins such as an acrylic resin, a polyester resin, an alkyd resin, a urethane resin, a silicone resin, a fluorine resin, an epoxy resin, a polycarbonate resin, a polyvinyl chloride resin, a polyvinyl alcohol and polybutyl alcohol, or radical polymerizable oligomers or monomers (which may be used in combination with a curing agent or a radical polymerization initiator, as the case requires) may be mentioned as typical examples. In a case where such a binder is liquid at room temperature or of a hot melt type, such a binder may be used as a non-solvent type without requiring a solvent which will be described hereinafter.

Such binders may be of various curing types such as a cold-setting type, a bake-curing type, an ultraviolet-curing type or a freeze-defreeze curing type.

Further, as a binder, an inorganic type material such as an alkoxide of Si, Ti, Zr or Al, or a partially hydrolyzed condensate of such an alkoxide, may also be used. Specifically, ethyl silicate, titanium tetraisopropoxide, zirconium tetrabutoxide or aluminum triisopropoxide, or a partially hydrolyzed condensate of a metal alkoxide prepared by adding a small amount of water and/or an acid to such metal alkoxide, may be mentioned as a typical example.

As the oxide powder (ii) to be used in the present invention, an oxide powder having an average primary particle size of at most 0.2 $\mu$m, preferably at most 0.1 $\mu$m and a light transmittance ratio (transmittance of light with a wavelength of 550 nm/transmittance of light with a wavelength of 1180 nm) of at least 3, is used to cut off near infrared rays while transmitting light in a visible light range.

As such an oxide powder, ITO powder, ATO powder, a powder of metal oxide such as tin oxide, or an inorganic oxide powder such as glass powder, may be mentioned as a typical example.

In the present invention, particularly preferred is ITO powder or ATO powder which shows a very low light transmittance in a near infrared range with a wavelength exceeding 1400 nm.

ITO powder may be prepared, for example, by a method disclosed in e.g. JP-A-7-70482.

Namely, an aqueous solution having water-soluble compounds (chlorides, nitrates, etc.) of In and Sn dissolved in water, for example, in such a ratio that the molar ratio of Sn/Sn+In will be from about 0.01 to 0.15, is reacted with an aqueous alkaline solution (an aqueous solution of e.g. a hydroxide or carbonate of an alkali metal or ammonium) for hydrolysis to precipitate In—Sn coprecipitated mixed hydroxides. The In—Sn coprecipitated mixed hydroxides in a water-containing state, thus obtained, are dried to remove moisture to obtain anhydrous mixed hydroxides, or dehydration is further proceeded to obtain mixed oxides or hydroxides in which at least a part has been converted to an oxide, which will be used as the starting material. Such a starting material is calcined in an oxygen shut-off condition in a pressurized inert gas atmosphere until it becomes an oxide completely to obtain ITO powder.

ATO powder may be produced, for example, by a method disclosed in e.g. JP-B-4-58511.

Namely, tin chloride and antimony chloride are dissolved in an alcohol, an aqueous hydrochloric acid solution, acetone or a mixture thereof in such a ratio that antimony constitutes from 0.1 to 20 wt %, and the rest is substantially tin oxide, and the solution thereby obtained, is added to hot water to let Sb-containing $SnO_2$ precipitate. The precipitate is subjected to filtration and washing, followed by calcination and pulverization to obtain ATO powder.

The dye (iii) to be used in the present invention is incorporated to solve a problem that in the case of an oxide powder alone, the light transmittance in a near infrared range with a wavelength of 700 to 1400 nm, is slightly high. For this purpose, it is a dye having a light transmittance ratio (transmittance of light with a wavelength of 550 nm/transmittance of light with a wavelength of from 740 to 930 nm) of at least 2.7.

Typical examples of such a dye include HR-175, HR-181, HR-180, MIR-316, SIR-114, SIR-130, SIR-132, SIR-159, PA-1001 (each of the foregoing being a tradename by Mitsui Toatsu Chemical Co. Ltd.), Kayasorb IR-750, Kayasorb IR-820, Kayasorb IRG-002, Kayasorb IRG-003, Kayasorb IRG-022, Kayasorb IRG-023, Kayasorb CY-2, Kayasorb CY-4, Kayasorb CY-9, and Kayasorb CY-20 (each of the foregoing being a tradename by Nippon Kayaku Co., Ltd.)

In the present invention, it is particularly preferred to employ a dye mixture comprising the following dyes (a), (b), (c) and (d), since it is thereby possible to obtain a near infrared screening filter showing a low light transmittance in a near infrared range with a wavelength of from 700 to 1400 nm.

Namely, it is a dye mixture comprising:
(a) a dye having a light transmittance ratio (transmittance of light with a wavelength of 550 nm/transmittance of light with a wavelength of 740 nm) of at least 3.5 (such as the above-mentioned HR-175 or Kayasorb IR-750),
(b) a dye having a light transmittance ratio (transmittance of light with a wavelength of 550 nm/transmittance of light with a wavelength of 778 nm) of at least 6 (such as the above-mentioned HR-181, Kayasorb IR-750 or Kayasorb CY-9),
(c) a dye having a light transmittance ratio (transmittance of light with a wavelength of 550 nm/transmittance of light with a wavelength of 794 nm) of at least 7 (such as the above-mentioned HR-180, Kayasorb IR-820 or Kayasorb CY-9), and
(d) a dye having a light transmittance ratio (transmittance of light with a wavelength of 550 nm/transmittance of light with a wavelength of 930 nm) of at least 2.7 (such as the above-mentioned MIR-316, Kayasorb IRG-002 or Kayasorb IRG-022), in the mixing ratio of 1:0.02 to 200:0.02 to 200:0.2 to 1000 by weight, preferably 1:1 to 10:1 to 20:2 to 20 by weight. Such a dye mixture has a remarkable effect for reducing the light transmittance in the above near infrared range.

The composition for forming a near infrared screening filter of the present invention comprises the binder (i), the oxide powder (ii) and the dye (iii) as described above, as essential components, and their blend ratio is preferably 100:1 to 100:0.01 to 5, more preferably 100:5 to 50:0.02 to 2, by weight.

If the oxide powder (ii) is less than the above range, the transmittance of light with a wavelength within a near infrared range tends to be high, whereby the function to cut off near infrared rays will decrease. On the other hand, if it is excessive, the transmittance of light with a wavelength within a visible light range tends to be low, whereby the transparency will be poor, and the physical and chemical properties of the resulting filter tend to be poor.

If the dye (iii) is less than the above range, the effect of reducing the light transmittance in a near infrared range with a wavelength of from 700 to 1400 nm, tends to be small. On the other hand, if it is excessive, the transmittance of light with a wavelength in a visible light range tends to be low, whereby the transparency tends to be low.

As a solvent to be incorporated, as a case requires, to the composition for forming a near infrared screening filter of the present invention, a solvent wherein the binder can be dissolved or stably dispersed, may be optionally selected. Specifically, water, an alcohol such as methanol, ethanol, propanol, hexanol or ethylene glycol, an aromatic hydrocarbon such as xylene or toluene, an alicyclic hydrocarbon such as cyclohexane, a ketone such as acetone or methyl ethyl ketone, an ester such as ethyl acetate, butyl acetate or cellosolve acetate, an ether such as cellosolve or or butyl cellosolve, or a mixture thereof, may be mentioned as a typical example. However, the solvent is not limited to such specific examples.

The amount of the solvent is optionally determined taking e.g. coating (printing) operation efficiency into consideration. It is usually such an amount that the solid content of the composition will be from 10 to 100 wt %.

The composition for forming a near infrared screening filter of the present invention may be applied by a method which comprises coating or printing it directly to a substrate from which near infrared rays are desired to be cut off, to form a cured coating film serving as a near infrared screening filter, a method which comprises forming the composition of the present invention into a film or a sheet and laminating or covering the formed product as a near infrared screening filter on a substrate from which near infrared rays are desired to be cut off, or a method which comprises laminating the above coating film or formed product made from the composition of the present invention on a substrate made of glass or plastic, and laminating or covering such a laminated product as a near infrared screening filter on a substrate from which near infrared rays are desired to be cut off.

As described in the foregoing, the composition for forming a near infrared screening filter of the present invention makes it possible to economically produce a filter which has an excellent function of cutting off near infrared rays while transmitting visible light and which is suitable for mass production.

Accordingly, such a filter is widely useful for e.g. preventing a malfunction of various IC devices or for preventing counterfeit of credit cards or the like, or for various windows for absorbing near infrared rays.

Now, the present invention will be described in further detail with reference to Examples. However, it should be understood that the present invention is by no means restricted to such specific Examples. In the Examples, "parts" means "parts by weight".

EXAMPLES 1 to 4 and COMPARATIVE EXAMPLES 1 to 4

A binder, ITO powder or ATO powder, a dye, a solvent and a dispersant, as identified in Table 1, were uniformly mixed and dispersed to obtain a composition for a near infrared screening filter.

The composition was coated on a transparent glass substrate so that the dried film thickness would be 100 $\mu$m, to obtain a filter.

Figure 2:
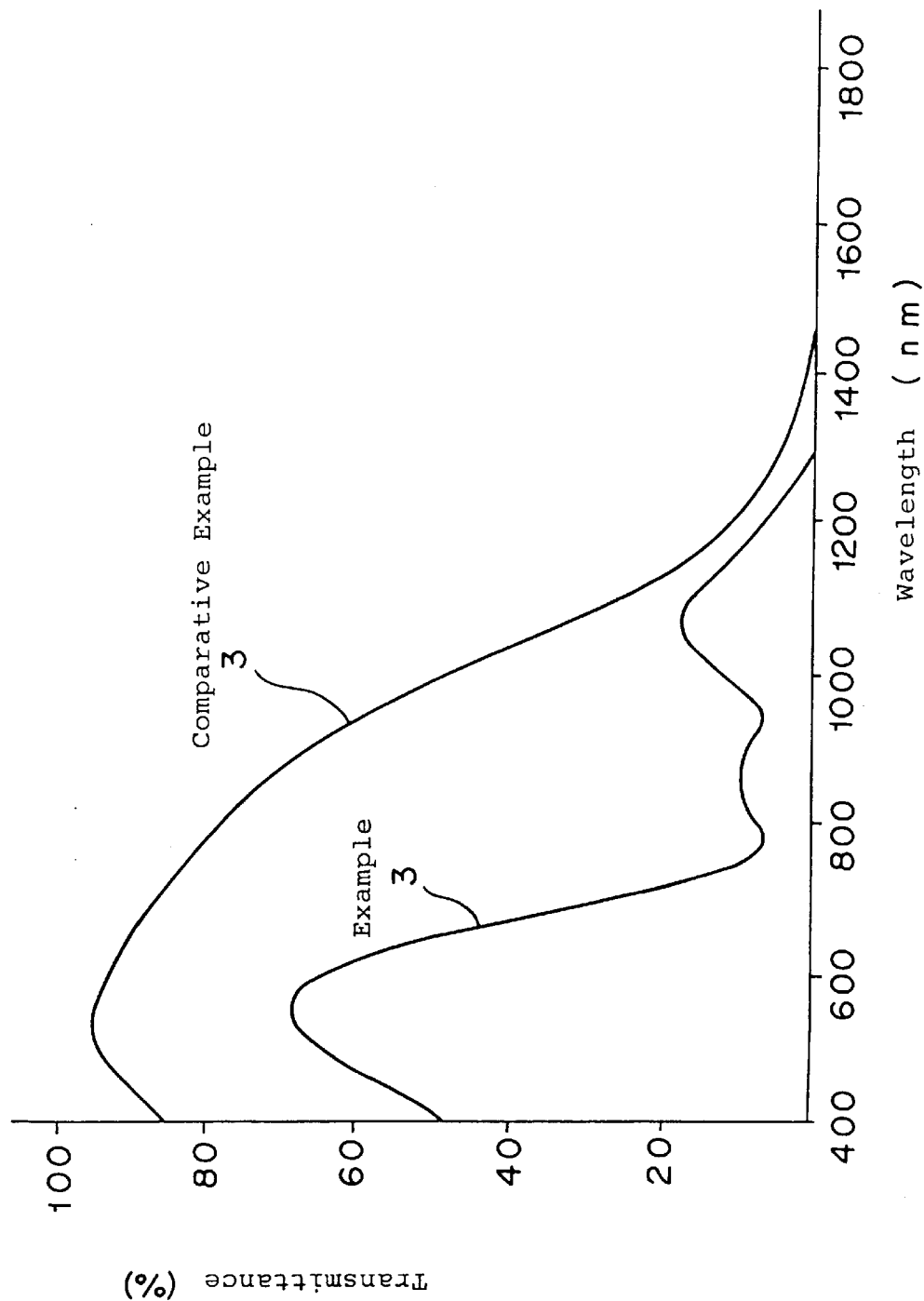
FIG. 2 shows spectral transmittance curves of the filters of Example 3 and Comparative Example 3.
Figure 3:
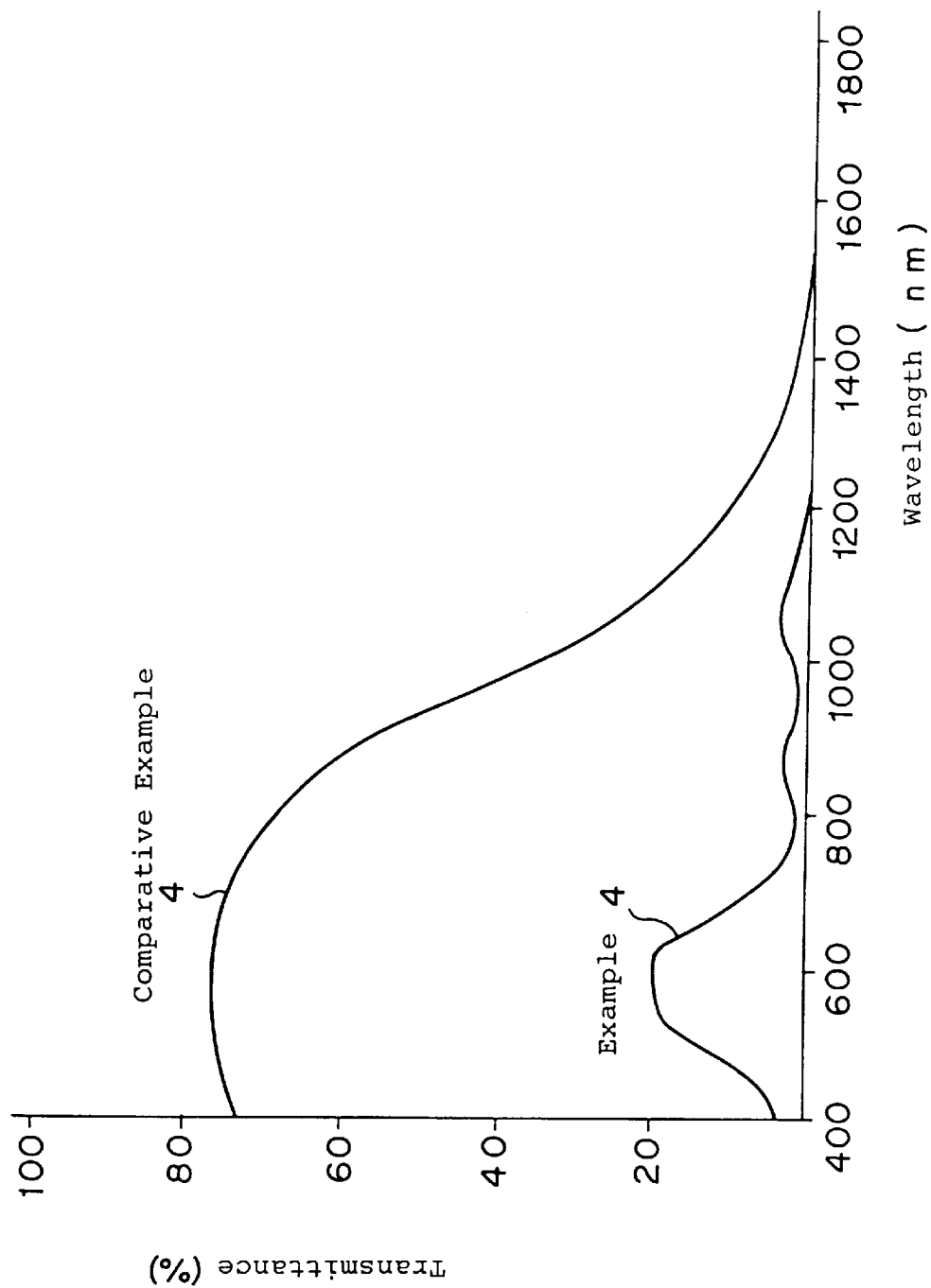
FIG. 3 shows spectral transmittance curves of the filters of Example 4 and Comparative Example 4.

The obtained filter was subjected to spectral measurement by means of a self-recording spectrophotometer 323 Model, manufactured by Hitachi, Ltd. and the spectral transmittance curves obtained in such a manner are shown in FIGS. 1, 2 and 3.

As is apparent from FIGS. 1, 2 and 3, the filters obtained in Examples 1 to 4 wherein the compositions of the present invention were used, show transmittance of light with a wavelength of from 400 to 699 nm in a visible light range and have low transmittance of light with a wavelength of at least 700 nm in a near infrared range, whereby it has been confirmed that such filters are useful as near infrared screening filters.

On the other hand, the filters obtained in Comparative Examples 1, 3 and 4 wherein compositions containing no dye were used, show high transmittance of light with a wavelength of from 700 to 1400 nm in a near infrared range. Further, the filter obtained in Comparative Examples 2 wherein a composition containing no ITO or ATO powder was used, shows high transmittance of light with a wavelength of at least about 1100 nm in a near infrared range.

Further, the maximum light transmittance ratio (maximum transmittance of light with a wavelength of from 400 to 699 nm/maximum transmittance of light with a wavelength of from 700 to 2200 nm) of each filter was as shown at the bottom of Table 1.

TABLE 1

(Unit: parts)

| | Examples | | | | Comparative Examples | | | |
|---|---|---|---|---|---|---|---|---|
| | 1 | 2 | 3 | 4 | 1 | 2 | 3 | 4 |
| Binder | | | | | | | | |
| Transparent acrylic resin | 100 | 100 | 63 | 100 | 100 | 100 | 63 | 100 |
| Transparent silicone resin | | | 37 | | | | 37 | |
| ITO powder *1) | 36 | 36 | 9 | | 36 | | 9 | |
| ATO powder *2) | | | | 36 | | | | 36 |
| Dye | | | | | | | | |
| Dye (a) *3) | 0.07 | | 0.02 | 0.07 | | 0.07 | | |
| Dye (b) *4) | 0.08 | | 0.03 | 0.08 | | 0.08 | | |
| Dye (c) *5) | 0.09 | | 0.03 | 0.09 | | 0.09 | | |
| Dye (d) *6) | 0.40 | 1.20 | 0.12 | 0.40 | | 0.40 | | |
| Solvent | | | | | | | | |
| Xylene | 75 | 75 | 4 | 75 | 75 | 50 | 4 | 75 |
| Toluene | 50 | 50 | 16 | 50 | 50 | 33 | 16 | 50 |
| Methyl ethyl ketone | 70 | 70 | 16 | 70 | 70 | 47 | 16 | 70 |
| Ethylene glycol monoethyl ether | 25 | 25 | | 25 | 25 | 17 | | 25 |
| Methanol | 4 | 4 | | 4 | 4 | 3 | | 4 |
| Ethanol | | | 2 | | | | 2 | |
| Isopropyl alcohol | | | 26 | | | | 26 | |
| Phosphoric acid type dispersant | | | 0.5 | | | | 0.5 | |
| Maximum light transmittance ratio *7) | 5.5 | 4.6 | 4.0 | 5.4 | 1.1 | 0.4 | 1.1 | 1.0 |

*1) Average primary particle size: 0.2 $\mu$m, light transmittance ratio (transmittance of light with a wavelength of 550 nm/transmittance of light with a wavelength of 1180 nm): 5
*2) Average primary particle size: 0.2 $\mu$m, light transmittance ratio (transmittance of light with a wavelength of 550 nm/transmittance of light with a wavelength of 1180 nm): 4.6
*3) Dye having a light transmittance ratio (transmittance of light with a wavelength of 550 nm/transmittance of light with a wavelength of 740 nm) of 45 ("HR-175", tradename, manufactured by Mitsui Toatsu Chemical Co., Ltd.)
*4) Dye having a light transmittance ratio (transmittance of light with a wavelength of 550 nm/transmittance of light with a wavelength of 778 nm) of 33 ("HR-181", tradename, manufactured by Mitsui Toatsu Chemical Co., Ltd.)
*5) Dye having a light transmittance ratio (transmittance of light with a wavelength of 550 nm/transmittance of light with a wavelength of 794 nm) of 10 ("HR-180", tradename, manufactured by Mitsui Toatsu Chemical Co., Ltd.)
*6) Dye having a light transmittance ratio (transmittance of light with a wavelength of 550 nm/transmittance of light with a wavelength of 930 nm) of 3.5 ("MIR-316", tradename, manufactured by Mitsui Toatsu Chemical Co., Ltd.)
*7) Maximum transmittance of light with a wavelength of from 400 to 699 nm/maximum transmittance of light with a wavelength of from 700 to 2200 nm

What is claimed is:

1. A composition for forming a near infrared screening filter, which comprises a binder (i), a metal oxide or inorganic oxide powder (ii) having a light transmittance ratio (transmittance of light with a wavelength of 550 nm/transmittance of light with a wavelength of 1180 nm) of at least 3 and selected from the group consisting of tin-doped indium oxide, antimony-doped tin oxide, tin oxide and glass, and a dye (iii) having a light transmittance ratio (transmittance of light with a wavelength of 550 nm/transmittance of light with a wavelength of from 740 to 930 nm) of at least 2.7, as essential components.

2. The composition for forming a near infrared screening filter according to claim 1, which comprises 100 parts by weight of the binder (i), from 1 to 100 parts by weight of the metal oxide or inorganic oxide powder (ii), and from 0.02 to 5 parts by weight of the dye (iii).

3. The composition for forming a near infrared screening filter according to claim 2, wherein the dye (iii) is a dye mixture comprising the following dyes (a), (b), (c) and (d) in their mixing ratio of 1:0.02 to 200:0.02 to 200:0.2 to 1000 by weight:
- (a) a dye having a light transmittance ratio (transmittance of light with a wavelength of 550 nm/transmittance of light with a wavelength of 740 nm) of at least 3.5,
- (b) a dye having a light transmittance ratio (transmittance of light with a wavelength of 550 nm/transmittance of light with a wavelength of 778 nm) of at least 6,
- (c) a dye having a light transmittance ratio (transmittance of light with a wavelength of 550 nm/transmittance of light with a wavelength of 794 nm) of at least 7, and
- (d) a dye having a light transmittance ratio (transmittance of light with a wavelength of 550 nm/transmittance of light with a wavelength of 930 nm) of at least 2.7.

4. The composition for forming a near infrared screening filter according to claim 1, wherein the metal oxide powder (ii) is tin-doped indium oxide, antimony-doped tin oxide or a mixture thereof.

5. A near infrared screening filter made of the composition for forming a near infrared screening filter as defined in claim 1.

* * * * *